(12) United States Patent
Zhong et al.

(10) Patent No.: US 10,405,324 B2
(45) Date of Patent: Sep. 3, 2019

(54) MULTI-THRESHOLD LISTENING METHOD FOR DYNAMIC SENSITIVITY CONTROL ENABLED WIRELESS MAC

(71) Applicant: Kabushiki Kaisha Toshiba, Minato-ku (JP)

(72) Inventors: Zhenzhe Zhong, Bristol (GB); Fengming Cao, Bristol (GB); Parag Gopal Kulkarni, Bristol (GB); Timothy David Farnham, Bristol (GB)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 15/416,188

(22) Filed: Jan. 26, 2017

(65) Prior Publication Data

US 2017/0223718 A1 Aug. 3, 2017

(30) Foreign Application Priority Data

Feb. 3, 2016 (GB) .................... 1601944.0

(51) Int. Cl.
*H04W 72/08* (2009.01)
*H04L 5/00* (2006.01)
(Continued)

(52) U.S. Cl.
CPC ........ *H04W 72/085* (2013.01); *H04B 17/318* (2015.01); *H04L 1/00* (2013.01);
(Continued)

(58) Field of Classification Search
CPC ........ H04L 5/006; H04L 43/16; H04W 24/08; H04W 72/085; H04W 84/12
(Continued)

(56) References Cited

U.S. PATENT DOCUMENTS 9,521,587 B2 * 12/2016 Krzymien ............. H04W 28/18
9,596,702 B2 * 3/2017 Smith ............... H04W 74/0816
(Continued)

FOREIGN PATENT DOCUMENTS

CN 103731858 A 4/2014
WO WO 2014/209919 A1 12/2014
(Continued)

OTHER PUBLICATIONS

Takeshi Itagaki, et al., "Dynamic CCA control and TPC Simulation Results with SS1-SS3", IEEE 802.11-15/1045r0, IEEE, Sony Corporation, Sep. 14, 2015, 53 pages, (Slide 1-53), https://mentor.ieee.org/802.11/dcn/15/11-15-1045-00-00ax-dynamic-cca-control-and-tpc-simulation-results-with-ss1-ss3.pptx.

(Continued)

*Primary Examiner* — Man U Phan
(74) *Attorney, Agent, or Firm* — Oblon, McClelland, Maier & Neustadt, L.L.P.

(57) ABSTRACT

A device and method for wirelessly communicating over a transmission channel with one or more wireless devices. The device comprises a wireless network interface and a controller. The controller is configured to receive a wireless signal via the wireless network interface, if strength of the received signal is greater than a first threshold, determine that the channel is busy, and, if the strength of the received signal is not greater than the first threshold, but is greater than a second threshold that is lower than the first threshold, determine whether the received signal is intended for the device and if so, determine that the channel is busy.

16 Claims, 11 Drawing Sheets

(51) Int. Cl.
*H04L 12/26* (2006.01)
*H04W 24/08* (2009.01)
*H04L 1/00* (2006.01)
*H04B 17/318* (2015.01)
*H04W 84/12* (2009.01)
*H04W 74/08* (2009.01)

(52) U.S. Cl.
CPC .............. *H04L 5/006* (2013.01); *H04L 43/16* (2013.01); *H04W 24/08* (2013.01); *H04L 1/0052* (2013.01); *H04W 74/0808* (2013.01); *H04W 84/12* (2013.01)

(58) Field of Classification Search
USPC ........................... 370/252–329; 455/457–522
See application file for complete search history.

(56) References Cited

U.S. PATENT DOCUMENTS

| | | | | |
|---|---|---|---|---|
| 9,622,262 | B2* | 4/2017 | Zhu | H04W 74/002 |
| 9,780,925 | B2* | 10/2017 | Sung | H04L 1/203 |
| 9,807,699 | B2* | 10/2017 | Oteri | H04W 52/243 |
| 9,860,917 | B2* | 1/2018 | Oh | H04W 74/0816 |
| 9,954,642 | B2* | 4/2018 | Wong | H04L 1/0026 |
| 2014/0376453 | A1 | 12/2014 | Smith | |
| 2015/0032868 | A1 | 1/2015 | Sung et al. | |
| 2015/0163824 | A1 | 6/2015 | Krzymien et al. | |
| 2015/0312941 | A1 | 10/2015 | Oh et al. | |
| 2016/0135142 | A1* | 5/2016 | Lee | H04L 1/1671 370/329 |
| 2017/0013482 | A1* | 1/2017 | Tandai | H04L 5/0048 |
| 2017/0332405 | A1* | 11/2017 | Son | H04W 74/0816 |
| 2017/0347376 | A1* | 11/2017 | Sakai | H04W 74/0825 |
| 2017/0374682 | A1* | 12/2017 | Jiang | H04W 74/0825 |

FOREIGN PATENT DOCUMENTS

| | | |
|---|---|---|
| WO | WO 2016/195012 A1 | 12/2016 |
| WO | WO 2017/038193 A1 | 3/2017 |
| WO | WO 2017/082094 A1 | 5/2017 |

OTHER PUBLICATIONS

M. Shahwaiz Afaqui, et al. "Evaluation of Dynamic Sensitivity Control Algorithm for IEEE 802.11ax", IEEE Wireless Communications and Networking Conference, 2015, 6 Pages.

Christina Thorpe, et al., "A Survey of Adaptive Carrier Sensing Mechanisms for IEEE 802.11 Wireless Networks", IEEE Communications Surveys and Tutorials, vol. 16 No. 3, 2013, pp. 1-27.

Takeshi Itagaki, et al., "Performance Analysis of BSS Color and DSC", IEEE 802.11-14-1403r0, Sony Corporation, Nov. 2014, 11 pages.

Search Report dated Jun. 29, 2016 in United Kingdom Patent Application No. GB1601944.0.

Office Action dated Feb. 6, 2018 in Japanese Patent Application No. 2017-014553.

Decision of Patent dated May 8, 2018 in Japanese Patent Application No. 2017-014553.

* cited by examiner

MULTI-THRESHOLD LISTENING METHOD FOR DYNAMIC SENSITIVITY CONTROL ENABLED WIRELESS MAC

TECHNICAL FIELD

Embodiments described herein relate generally to wireless communication methods and devices and, more specifically, to methods and devices for managing the clear channel assessment (CCA) thresholds for wireless devices.

BACKGROUND

Wireless Local Area Network (WLAN) technology has significantly matured over the last decade and while it continues to function well, there are scenarios where it struggles to deliver acceptable performance for the most basic services. Due to the success of WLAN, wireless networks are increasingly getting denser in order to meet huge traffic demand. It has been challenging for current wireless networks to tackle some problems due to the high density, notably, the overlapping basic service set (OBSS) problem.

Generally, wireless networks comprise a wireless access point (AP) which allows wireless stations (STAs) to wirelessly connect to a wired network. A wireless station is a device which has the capability to connect wirelessly to a wireless network, for instance, via the 802.11 wireless protocol. A wireless access point (AP) has station functionality but also manages all the distributed stations within a network and is able to connect to a wired network to provide the stations within the wireless network with access to the wired network.

One of the main causes of wireless performance deterioration is overcrowding of devices in the unlicensed bands where WLANs typically operate. This is particularly a risk in dense deployment environments, such as apartments, conference venues and shopping centres.

Increased density increases the likelihood of collision between two wireless transmissions, unless steps are taken to mitigate this likelihood.

One approach to attempt to reduce the possibility of collision is for a station (STA), before using a channel, to sense the channel to determine if the channel is clear to be used. This is often governed by clear channel assessment (CCA) thresholds, parameters used to define the sensitivity of a station to incoming transmission from other STAs. If signals are received that have a received signal strength that is below the CCA thresholds, then the signals are ignored and the station is free to transmit over the channel. Accordingly, the higher the CCA thresholds, the less sensitive the device is to wireless signals.

An alternative method of preventing clashes between nearby networks assigns a different "colour" to each network. A single network is a single basic service set (BSS), comprising at least one access point and one station. Each BSS is assigned a colour which is communicated to the stations in the BSS. When a station or access point in the network transmits, it includes an indicator of the colour of the network. When a station or access point (the receiving device) receives this information, it checks whether the colour indicated in the received data is the same as the colour for the network in which the receiving device is operating. If the colour is different, the received signal is ignored if the received signal strength is below a predefined deferral level. This allows stations and access points to ignore signals from devices outside of their network.

Dynamic Sensitivity Control (DSC) is a method in which one or more of the CCA thresholds for a station are varied to minimise overhearing other devices operating on the same channel in adjacent networks (crosstalk). This is relatively straightforward from the perspective of non-access point, station nodes because the stations merely need to ensure that the adapted CCA thresholds still enable them to hear the access point. The situation is more complicated on the access point side as the access point has to track multiple stations and ensure that it does not disconnect any stations by increasing the CCA thresholds (and thereby reducing the sensitivity) too far.

Problems may arise where existing nodes connected to the access point may move away from the access point thereby going out of range of the access point. Similarly, new nodes that wish to associate with the access point may arrive but are prevented from accessing the network because of the access point's curtailed CCA range. In such scenarios it is desirable that there exists a way to detect such problems and trigger the DSC algorithm to relax the CCA thresholds to increase the range of the access point and mitigate any problems associated with coverage holes.

BRIEF DESCRIPTION OF THE DRAWINGS

Embodiments of the present invention will be understood and appreciated more fully from the following detailed description, made by way of example only and taken in conjunction with drawings in which.

DETAILED DESCRIPTION

Figure 1:
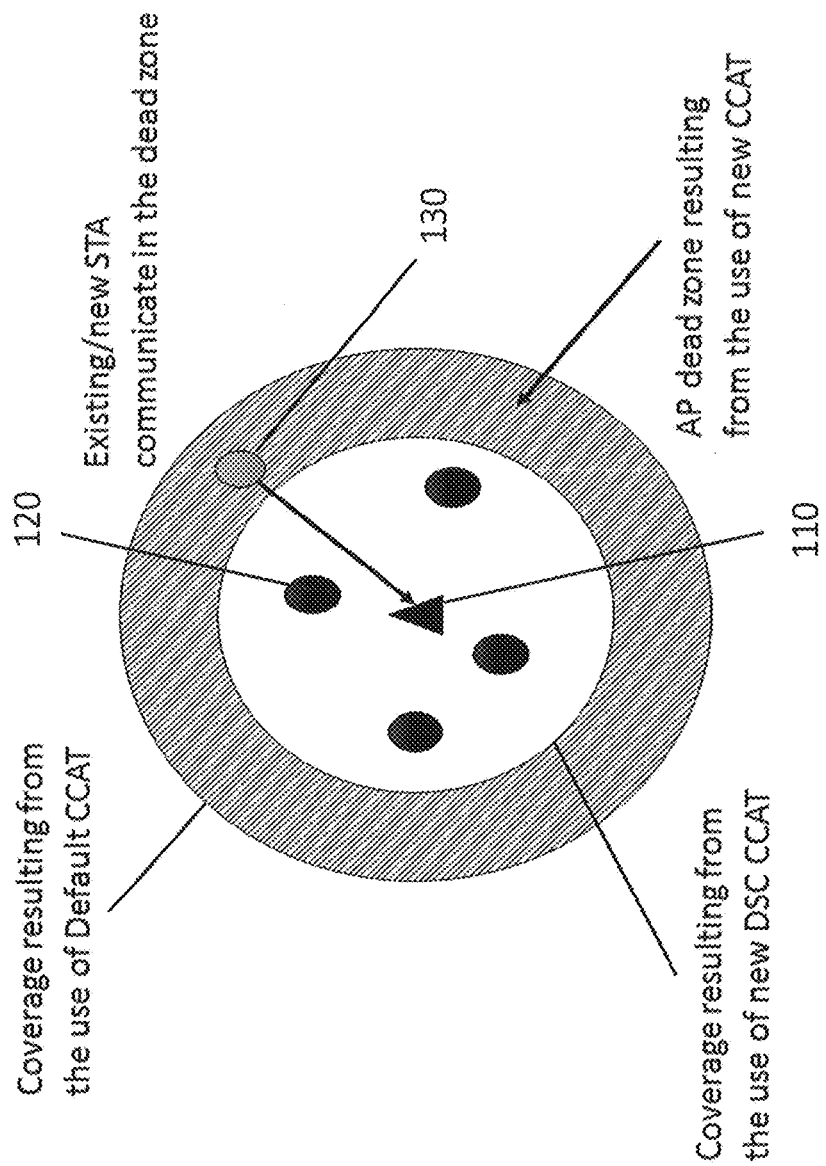
FIG. 1 shows an illustration of a dead zone caused by the CCA thresholds (CCAT) for an access point being increased via DSC.

According to a first aspect, there is provided a device for wirelessly communicating over a transmission channel with one or more wireless devices, the device comprising a wireless network interface and a controller. The controller is configured to receive a wireless signal via the wireless network interface, if strength of the received signal is greater than a first threshold, determine that the channel is busy, if the strength of the received signal is not greater than the first threshold, but is greater than a second threshold that is lower than the first threshold, determine whether the received signal is intended for the device and if so, determine that the channel is busy.

Accordingly, embodiments provide a dual threshold means of carrier sensing in which strong signals are immediately registered but the channel is only set to busy for intermediate signals (signals with a received signal strength between the first and second thresholds) if the signal is intended for the receiving device. This allows dynamic sensitivity control to be applied without losing connectivity to valid users at the edge of the network. The device may be an access point and/or a station. A signal may be intended for the device if it is directed towards or addressed to the device.

In one embodiment, the controller is configured to, if the signal is not found to be intended for the device then determine the channel to be idle. This may be subject to any energy detection that is being performed in parallel with the carrier sensing described herein.

According to an embodiment, the second threshold is a predefined threshold and the controller is configured to vary the first threshold based on a predefined set of dynamic sensitivity control rules. The second threshold may be a default threshold or the lowest sensitivity threshold possible based on the hardware of the device. The dynamic sensitivity control rules may specify how the first threshold is varied based on the on network performance. Accordingly, the controller may be configured to vary the first threshold based on network performance. As mentioned above, this allows the first threshold to be varied to optimise the performance of the network but the second threshold allows legitimate communication within the network to be maintained where it would otherwise have failed due to stations falling into deadzones.

According to an embodiment, the controller is configured to, if the received signal is determined to be intended for the device, lower the first threshold to improve detection of any further wireless signals from the source of the wireless signal. Accordingly, if the received signal has a signal strength (RSS) that is greater than the second threshold but less than or equal to the first threshold, and if the signal is intended for the device, then the first threshold is lowered. This is because a coverage hole has been detected and so the first threshold should be lowered to allow the legitimate network user to communicate with the device. In this case, the first threshold may be lowered according to dynamic sensitivity control rules.

According to an embodiment, determining whether the received signal is intended for the device comprises decoding a header portion of the received signal, wherein the received signal is determined to be intended for the device when the header includes an indication that the device is the intended recipient.

The signal may be a frame comprising a header portion and a message portion. The device may be configured to determine whether the signal is for the device based on the header portion of the frame. If the signal is intended for the device then the device may decode the message portion.

The header portion may comprise a PLCP header and/or a MAC header. The device may be determined to be the intended recipient if it is found to be the intended final destination for the signal or simply an intended receiver which is to forward or otherwise redirect the signal on to another device. That is, the device may be the intended recipient if it has an address that matches a destination or receiver addresses contained in the header portion. The determination of whether the device is the intended recipient may also be based on whether the basis service set (BSS) colour of the device matches a BSS colour contained in the header portion of the signal.

According to a further embodiment, the indication that the device is the intended recipient comprises a media access protocol address of the device, a service set ID of the device, a basic service set ID of the device and/or a basic service set colour of the device. The signal may comprise a frame. The frame may be a data frame or an association request frame.

In one embodiment, the controller is configured to, during the decoding of the header portion determine that the channel is idle, or determine that the channel is busy. The former option provides faster transfer of data whilst the latter provides a more stable means of transferring data in which collisions are minimised.

Transmission of data by the device on the channel may be inhibited during periods in which the channel is determined to be busy.

According to an embodiment, the controller is configured to, prior to transmitting a signal on the channel, determine if the channel is idle over a first predefined period of time and a first randomly assigned period of time. If the channel is busy during the first predefined period of time, transmission is delayed until the channel becomes idle and, once the channel becomes idle, it is determined whether the channel is idle over a further period and, if the channel is idle for the whole of the further period, transmission of the further signal is begun. The further period consists of a second predefined period and a second randomly assigned period of time, wherein the second predefined period is shorter than the first predefined period of time. Alternatively, the further period consists of the second randomly assigned period of time.

The first period of time may be the Distributed Coordination Function Inter-frame Space interval (DIFS interval) and the first and second randomly assigned periods of time may be contention windows. Accordingly, where the transmission is interrupted during the initial DIFS interval, transmission may be resumed after the channel becomes free again with no DIFS interval prior to a new contention window, or a shorter delay than the DIFS interval. The second predefined period of time may be the Short Inter-frame Space interval (SIFS interval) or PCT Inter-frame Space (PIFS) interval.

According to a further embodiment, the controller is configured to, prior to transmitting a further signal over the channel, determine if the channel is idle over a first predefined period of time and a first randomly assigned period of time. If the channel is busy during the first randomly assigned period of time, transmission is delayed until the channel becomes idle and the remaining time left of the first randomly assigned period of time is stored. Once the channel becomes idle, it is determined whether the channel is idle over a further period and, if the channel is idle for the whole of the further period, transmission of the further signal is begun. The further period consists of a second predefined period and the remaining time left of the first randomly assigned period of time. Alternatively, the further channel consists of the remaining time left of the first randomly assigned period of time.

As above, the first period of time may be the Distributed Coordination Function Inter-frame Space interval (DIFS interval) and the first and second randomly assigned periods of time may be contention windows. Accordingly, where the transmission is interrupted during the first contention window, transmission may be resumed after the channel becomes free again with no DIFS interval prior to a resumption of the first contention window, or a shorter delay than the DIFS interval being applied prior to the resumption of the first contention window. The second predefined period of time may be the Short Inter-frame Space interval (SIFS interval) or PCF Inter-frame Space (PIFS) interval.

According to an aspect there is provided a method for managing a device for wirelessly communicating over a transmission channel with one or more wireless devices, the device comprising a wireless network interface and a controller configured. The method comprises the controller receiving a wireless signal via the wireless network interface, if strength of the received signal is greater than a first threshold, determining that the channel is busy, and if the strength of the received signal is not greater than the first threshold, but is greater than a second threshold that is lower than the first threshold, determining whether the received signal is intended for the device and if so, determining that the channel is busy.

According to an embodiment, the second threshold is a predefined threshold and the controller varies the first threshold based on a predefined set of dynamic sensitivity control rules.

According to an embodiment, the controller, if the received signal is determined to be intended for the device, lowers the first threshold to improve detection of any further wireless signals from the source of the wireless signal.

According to an embodiment, determining whether the received signal is intended for the device comprises decoding a header portion of the received signal, wherein the received signal is determined to be intended for the device when the header includes an indication that the device is the intended recipient.

According to an embodiment, the indication that the device is the intended recipient comprises a media access protocol address of the device, a service set ID of the device, a basic service set ID of the device and/or a basic service set colour of the device.

According to an embodiment, the method further comprises the controller, during the decoding of the header portion, determining that the channel is idle, or determining that the channel is busy.

According to an embodiment, the method further comprises, prior to transmitting a further signal over the channel, determining if the channel is idle over a first predefined period of time and a first randomly assigned period of time. If the channel is busy during the first predefined period of time, transmission is delayed until the channel becomes idle. Once the channel becomes idle, it is determined whether the channel is idle over a further period and, if the channel is idle for the whole of the further period, transmission of the further signal is begun. The further period consists of a second predefined period and a second randomly assigned period of time, wherein the second predefined period is shorter than the first predefined period of time. Alternatively, the further prior consists of the second randomly assigned period of time.

According to an embodiment, the method further comprises, prior to transmitting a further signal over the channel, determining if the channel is idle over a first predefined period of time and a first randomly assigned period of time. If the channel is busy during the first randomly assigned period of time, transmission is delayed until the channel becomes idle and the remaining time left of the first randomly assigned period of time is stored. Once the channel becomes idle, it is determined whether the channel is idle over a further period and, if the channel is idle for the whole of the further period, transmission of the further signal is begun. The further period consists of a second predefined period and the remaining time left of the first randomly assigned period of time. Alternatively, the further period consists of the remaining time left of the first randomly assigned period of time.

According to an embodiment there is provided a non-transitory computer readable medium comprising computer-readable instructions for causing a computer to perform any of the above methods.

It should be noted that, whilst the embodiments herein are described in relation to signal strengths being less than a first threshold and not less than a second threshold, these embodiments could equally be implemented based on a determination of the received signal strength being greater than the second threshold and not greater than the first threshold, or via any equivalent mathematical functions, such as greater than and equal to or less than and equal to.

In dense access point deployment, the use of access point dynamic sensitivity control (AP-DSC) is important to increase the intra-cell downlink throughput. Implementing AP-DSC could; however, potentially increase the likelihood of coverage holes (dead zones) into which members (or potential members) of the network may fall. When the access point sets up a DSC level, the access point will generally raise the CCA thresholds according to the performance of the set of stations currently in the network.

CCA involves monitoring the wireless channel for any transmissions. CCA comprises two functions, energy detection (ED) and carrier sense (CS). Both have their own thresholds setting limits for the received signal strength, below which received signals are ignored. Each function has its own status, identifying whether the given criteria for the threshold have been exceeded. If one or both of the energy detection and carrier sense statuses are set to TRUE then the carrier is deemed to be busy.

If any energy is detected in the carrier (in the frequency channel) which exceeds the energy detection threshold, regardless of whether the energy is a signal according to a wireless protocol or if it is any other source of energy such as interference, then the energy detection status is set to TRUE. Otherwise, the energy detection status is set to FALSE.

If a wireless signal according to a wireless protocol (such as the 802.11 protocol) is received that has a received signal strength that exceeds the carrier sense threshold then the carrier sense status is set to TRUE. Otherwise, the carrier sense status is set to FALSE.

If either (or both of) the carrier sense or energy detection statuses are TRUE, then the channel is determined to be busy and transmissions by the station are delayed to prevent collisions. Transmission of any data is deferred until the channel becomes idle. If both of the carrier sense and energy detection functions are FALSE then the channel is deemed to be idle and the station is allowed to transmit across the channel.

The lower of the carrier sense threshold and the energy detection threshold effectively dictates the receiver sensitivity of the station. Signals below the CCA thresholds will effectively not be detected. This is even though the hardware of the receiver may still be capable of detecting weaker signals. For instance, increasing the carrier sense threshold (e.g. from −80 dBm to −60 dBm) effectively decreases the sensitivity of the receiver with regard to wireless signals and will therefore make the station less "sensitive" to signals from other stations.

If the carrier sense threshold is increased, the station access point will ignore those signals that may be present in the channel that, before the increase in the carrier sense threshold would have been classified as valid signals (and the detection of which would have, consequently, lead the station or access point to suppress its own transmission activity), but that, following the increase of the carrier sense threshold, now fall below the new carrier sense threshold (and, consequently, no longer inhibit transmissions from the station or the access point). These signals are simply filtered out. The signals concerned are those that, before the increase in the carrier sense threshold, had been just above the then valid carrier sense threshold and are often signals from distant stations.

It will be appreciated that adapting CCA thresholding in the above described manner can help to prevent interference between networks in close proximity. Having said this, it can also lead to dead zones in which legitimate members of the network, or stations requesting to join the network, cannot communicate with the access point.

For instance, when the current stations have a crowded distribution around the access point, the CCA thresholds will generally be raised to reduce the range and avoid interference from neighbouring networks. In this case, the carrier sense threshold will likely be too high for a new edge user to join the cell or for those stations that move out of range of the carrier sense threshold. In other words, the association request (the request to join a network) from a new user may be ignored by the access point. This is one of the primary reasons why DSC is not usually applied to access points.

FIG. 1 shows an illustration of a dead zone caused by the CCA thresholds (CCAT) for an access point being increased via DSC. An access point 110 originally has default CCA thresholds (CCAT) with a maximum range (shown by the outer circle). When the stations 120 in the network are close to the access point 110, the CCA thresholds are increased to new CCA thresholds, thereby reducing the range of the access point 110 (shown by the inner circle). This helps to prevent interference from other wireless networks nearby.

As the stations 120 in the network are located close to the access point 120, a strong signal will be received from the stations 110. Accordingly, the CCA thresholds may be increased to a relatively high level (reducing the receiver sensitivity) without interfering with direct communication between the access point 110 and the stations 120.

The default CCA thresholds are generally set to be relatively conservative/low. It will be appreciated that, by increasing the CCA thresholds, throughput between stations 120 and the access point 110 may be increased. Whilst this is of course desirable it comes with some disadvantages.

In particular, raising the CCA thresholds (specifically the carrier sense threshold) creates a dead zone (shown by the shaded ring) in which a new station 130 trying to join the network, or a current member of the network which has moved away from the access point 110, cannot communicate with the access point 110 even though the hardware of the access point 110 is technically capable of communicating with the station 130. In this area, any station 130 attempting to communicate with the access point 110 would be ignored as the received signal strength would be less than the new carrier sense threshold.

Embodiments include a multi-threshold listening method to solve the above problem without requiring any significant changes to the wireless hardware. By adapting the logic on the access point side, existing wireless systems can be easily configured to operate according to the methods described herein.

Embodiments implement dynamic sensitivity control (DSC) in an access point to vary the carrier sense threshold; however, the default carrier sense threshold is also retained. When the access point receives a signal with a received signal strength (RSS) between the adapted carrier sense threshold and the default carrier sense threshold, one or more headers of the received signal are read and, if the header indicates that the signal is directed towards the access point, the channel is determined to be busy. If the signal is not directed towards the access point then the signal is ignored (the channel is determined to be idle).

Figure 2:
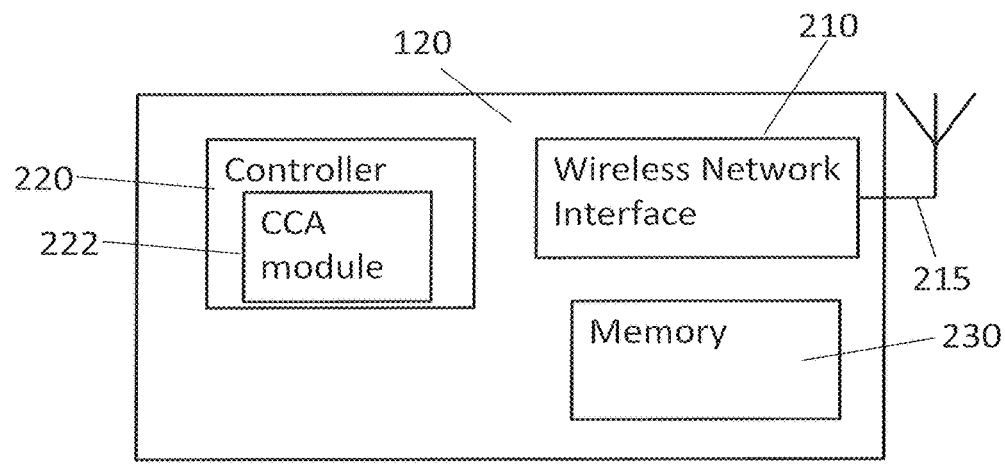
FIG. 2 shows a station.

FIG. 2 shows a station 120 in detail. The station 120 comprises a wireless network interface 210, a memory 230 and a controller 220 comprising a clear channel assessment (CCA) module 222. The wireless network interface 210 is coupled to an antenna 215. The wireless network interface 210 is operable to send and receive signals using the antenna 215 on one or more of a plurality of radio frequency channels defined in a radiofrequency spectrum. The controller 220 is configured to manage the wireless network interface 210 to send and receive signals according to a communication protocol to, for example, stations or access points as described above in relation to FIG. 1. The CCA module 222 is configured to determine when the channel is clear to reduce frame collisions at the access point 110. The controller 220 is in communicative connection with the memory 230 which stores computer readable code for instructing the controller to perform the functions described herein.

Figure 3:
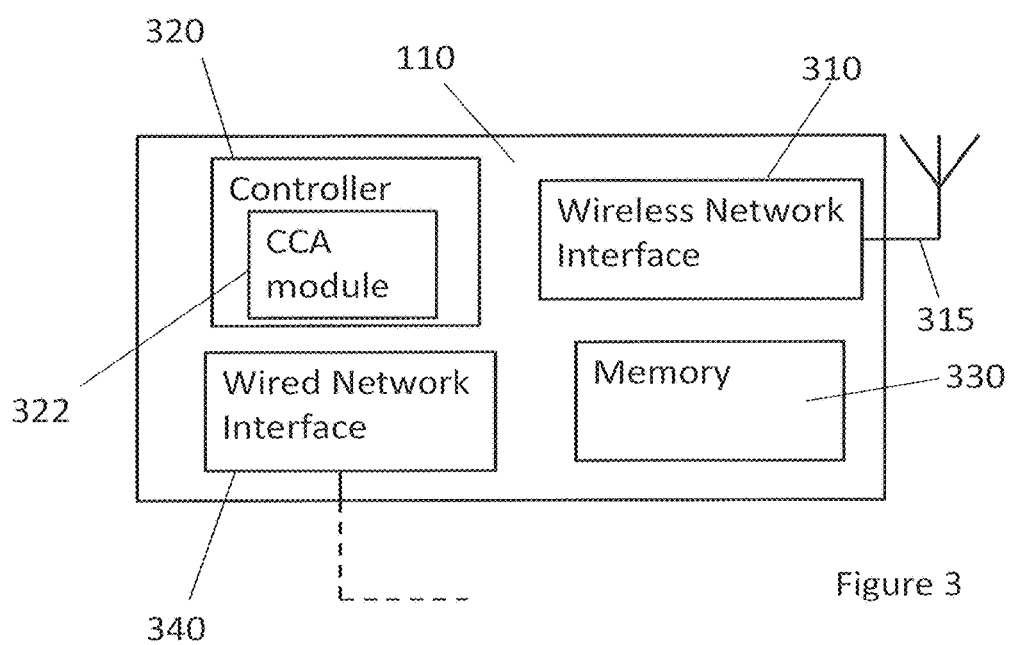
FIG. 3 shows an access point according to an embodiment.

FIG. 3 shows an access point 110 according to an embodiment. The access point 110 comprises a wireless network interface 310, a memory 330 and a controller 320 comprising a clear channel assessment (CCA) module 322. The wireless network interface 310 is coupled to an antenna 315. The access point 110 functions much like the station 120, with the exception that the access point 110 includes a wired network interface 340 that is configured to connect to a wired network, for instance, via an Ethernet connection. The access point 110 is configured to provide wireless stations 120 with access to the wired network.

In addition, the controller 320 is configured to manage connections with wireless stations 120 in the wireless network. As shall be discussed below, the controller 320 implements dynamic sensitivity control (DSC) to vary the CCA thresholds to avoid interference from nearby wireless networks, whilst also implementing a method of allowing stations 120 which are located outside of the range of the adapted CCA thresholds to communicate with the access point 110.

The methods carried out by the modules of the access point 110 and the stations 120 are described in more detail below. It will be appreciated that these methods are implemented by software or firmware code that may be stored in memories 230 and 330 of station 120 and access point 110 respectively and that, when executed by the respective controllers 220 and 320 (or their respective CCA modules 222 and 322) puts the described methods into practice.

Any reference to modules 222, 322 that form part of the controllers 220 and 320 is not intended to be limiting and is, instead, intended to be understood as an operation/method put into practice by the controllers 220 and 320 respectively, when executing the corresponding software/firmware instructions. In addition, any reference to controllers 220 and 320 is not intended to be limiting and is, instead, intended to be understood as a hardware component such as a processor that is capable of performing computational tasks.

As discussed above, implementing DSC in an access point 110 can result in improved network performance and reduced interference from neighbouring networks; however, it can also result in dead zones which prevent valid network users 130 from accessing the network. Embodiments implement a method in which DSC is used to set an adjusted carrier sense threshold that is higher than the default carrier sense threshold. Received messages which have a received signal strength (RSS) that is between the default and adjusted carrier sense thresholds are checked to see if they are directed towards the access point 110 and if so, the channel is set to "BUSY" for the period of the message. This allows the access point 110 to implement dynamic sensitivity control to reduce interference with neighbouring networks, whilst still allowing stations 130 that are outside of the range of the adjusted carrier sense threshold to communicate with the access point 110.

Figure 4:
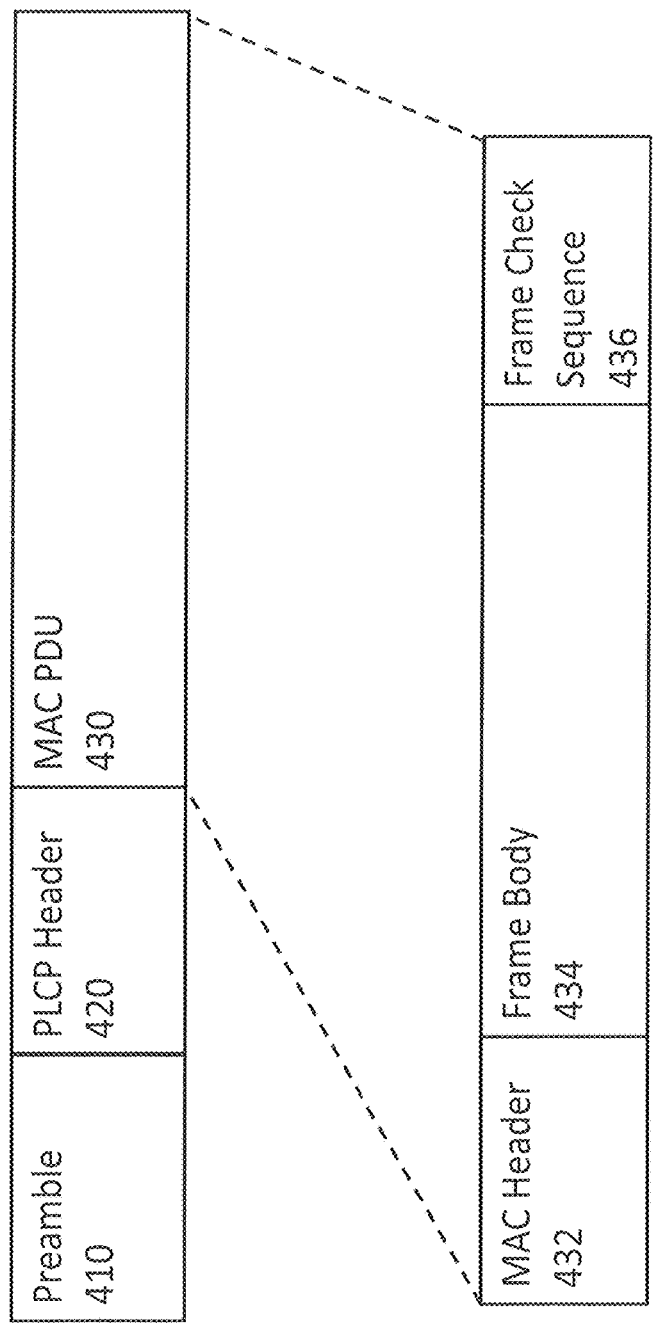
FIG. 4 shows structure of a frame according to the 802.11 protocol.

FIG. 4 shows the structure of a frame 400 according to the 802.11 protocol. The frame 400 comprises a preamble 410, a physical layer convergence protocol (PLCP) header 420 and a media access control (MAC) protocol data unit (PDU) 430. This forms a PLCP protocol data unit (PPDU) which is received by the physical layer of a receiving device (a station or access point), before the preamble 410 and PLCP header 420 are stripped from the frame 400 and the MAC PDU 430 is passed to the MAC layer of the receiving device.

The preamble 410 enables the device receiving the frame to synchronize to the incoming signal to allow the actual content of the frame to be correctly detected. The PLCP header 420 provides information about the frame, such as the length of the frame, the modulation that has been used on the frame and, if applicable, the BSS colour of the frame. Accordingly, where BSS colour is being implemented, the PLCP header 420 will include information detailing the colour of the frame to allow a receiving device to determine whether the frame originates from a device (a station or an access point) in its own network (sharing the same BSS colour).

The MAC PDU comprises a MAC header 432, the frame body 434 and a frame check sequence 436. The frame body 434 contains the data or message being transmitted (the content of the frame). The frame check sequence 436 is an error detecting code to allow the detection of errors in the frame. The MAC header 432 comprises further information relating to the frame, such as:
- the BSS identifier (BSSID) which uniquely identifies the network within which the frame is being transmitted. It is associated with a single access point and may sometimes be the MAC address of the access point;
- the MAC address of the intended final destination of the frame (destination address/receiver address);
- the MAC address of the source of the frame (source address/transmitter address);

Accordingly, the MAC header 432 comprises information identifying the intended recipient of the transmitted frame. It is only after the MAC header 432 has been received that a given station or access point knows that it is the intended recipient of the frame and therefore knows whether to continue to decode the frame.

Embodiments utilise CCA to identify whether the channel is busy, and therefore any transmissions should be delayed, or whether the channel is clear and therefore free for transmission. This is implemented via two true/false flags: energy detection (ED) and carrier sense (CS). Each flag has its own threshold (the carrier sense threshold and the energy detection threshold respectively). If either CS or ED (or both) are TRUE then the channel is deemed to be busy. If both CS and ED are FALSE then the channel is deemed to be idle.

If the energy detected on the channel is greater than the energy detection threshold then ED is set to TRUE. This applies to any signal on the channel. If a wireless local area network (WLAN) signal with an energy greater than the carrier sense threshold is being received at the antenna then CS is set to TRUE. This only applies to WLAN signals (signals according to the 802.11 protocol). Such a signal may be detected when a preamble according to the 802.11 protocol is detected (as discussed above).

When the receiver is synchronized with a PLCP preamble, the CS function outputs TRUE. This causes the channel to be deemed BUSY throughout the period of the PLCP header. After the header has been decoded, the receiver will keep CS TRUE for the whole length of the frame to prevent transmissions which may interfere with the frame. If the frame is for the receiver, then the receiver will decode the content of the frame (the PSDU). If the frame is not for the receiver, the frame will not be decoded (but CS will still be set to TRUE for the length of the frame to avoid any transmissions from the receiver interfering with the receipt of the frame by another device).

Figure 5:
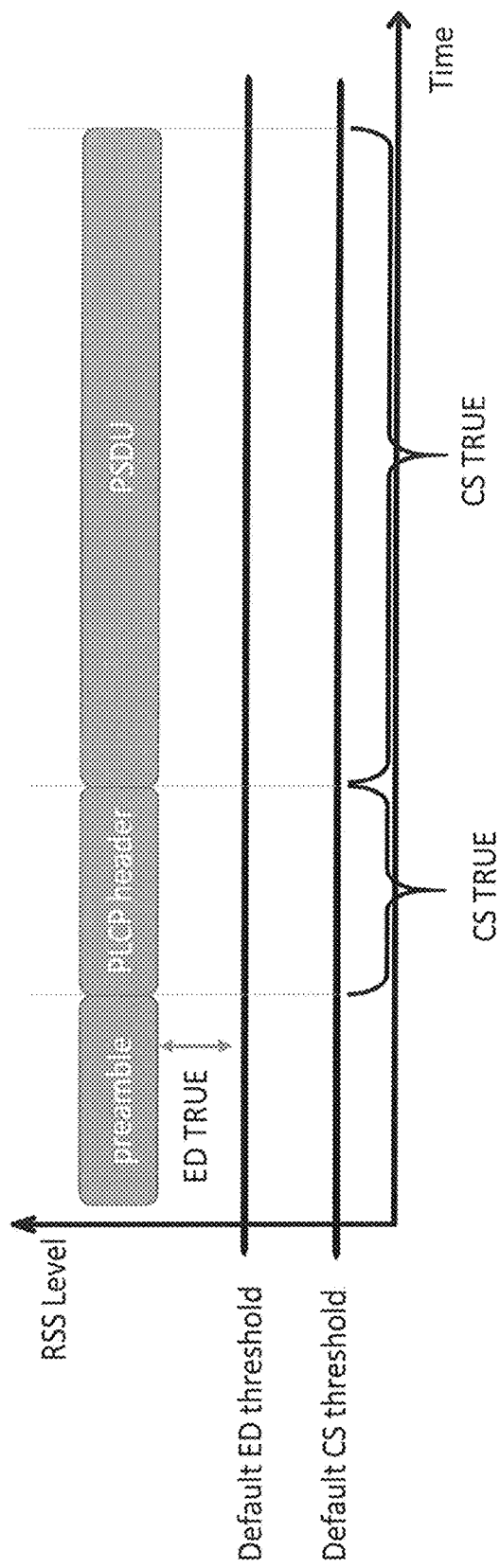
FIG. 5 shows an illustration of the successful detection of a frame.

FIG. 5 shows an illustration of the successful detection of a frame. FIG. 5 plots received signal strength (RSS) against time. Default CS and ED thresholds are defined, with the ED threshold being greater than the CS threshold. A WLAN signal is received with an RSS that is greater than both the ED and CS thresholds. As the RSS exceeds the ED threshold, ED is set to TRUE. This on its own would result in the channel being deemed busy. Nevertheless, as a preamble is received with an RSS that is greater than the CS threshold, it is determined that a WLAN signal has been received and CS is set to TRUE during the receipt of the PLCP header. CS is kept TRUE for the duration of the receipt of the frame (the PSDU). Accordingly, the channel is deemed to be busy for the whole duration of the receipt of the frame.

As mentioned above, the introduction of DSC to improve the downlink throughput can result in a coverage dead zone if the CCA thresholds (the ED and CS thresholds) are increased too much.

Figure 6:
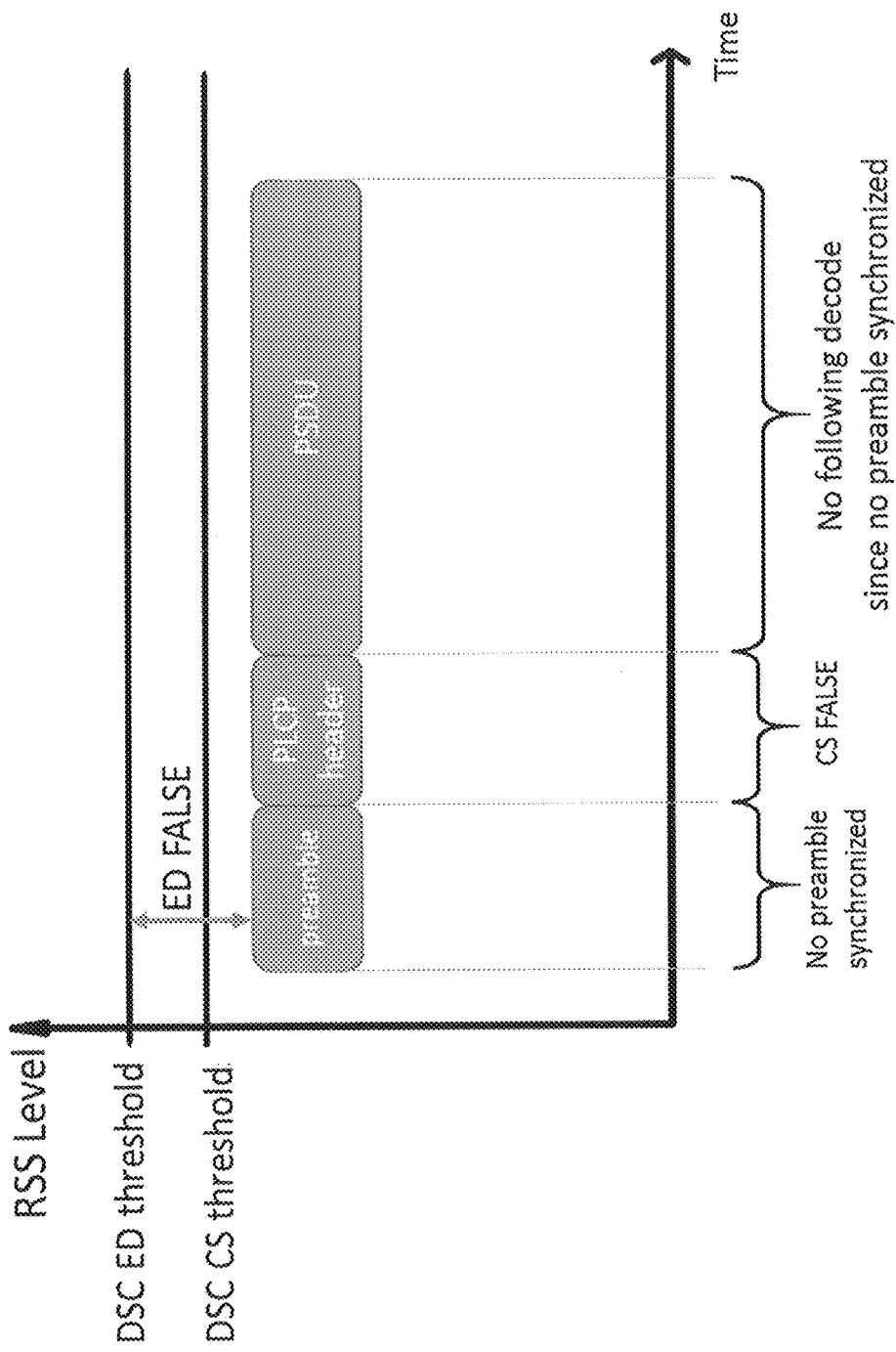
FIG. 6 shows an illustration of the unsuccessful detection of a frame caused by the CCA threshold being set too high.

FIG. 6 shows an illustration of the unsuccessful detection of a frame caused by the CCA thresholds being set too high by DSC. As in FIG. 5, the RSS has been plotted against time. Unlike FIG. 5, the ED and CS thresholds have been increased by DSC to higher levels. Accordingly, in this scenario, the received frame is now below the new DSC ED and DSC CS thresholds. This results in ED and CS being set to FALSE thereby causing the receiver to deem the channel to be idle. In addition, as the preamble is not synchronised, the frame is not decoded and so the data is not received.

Figure 7:
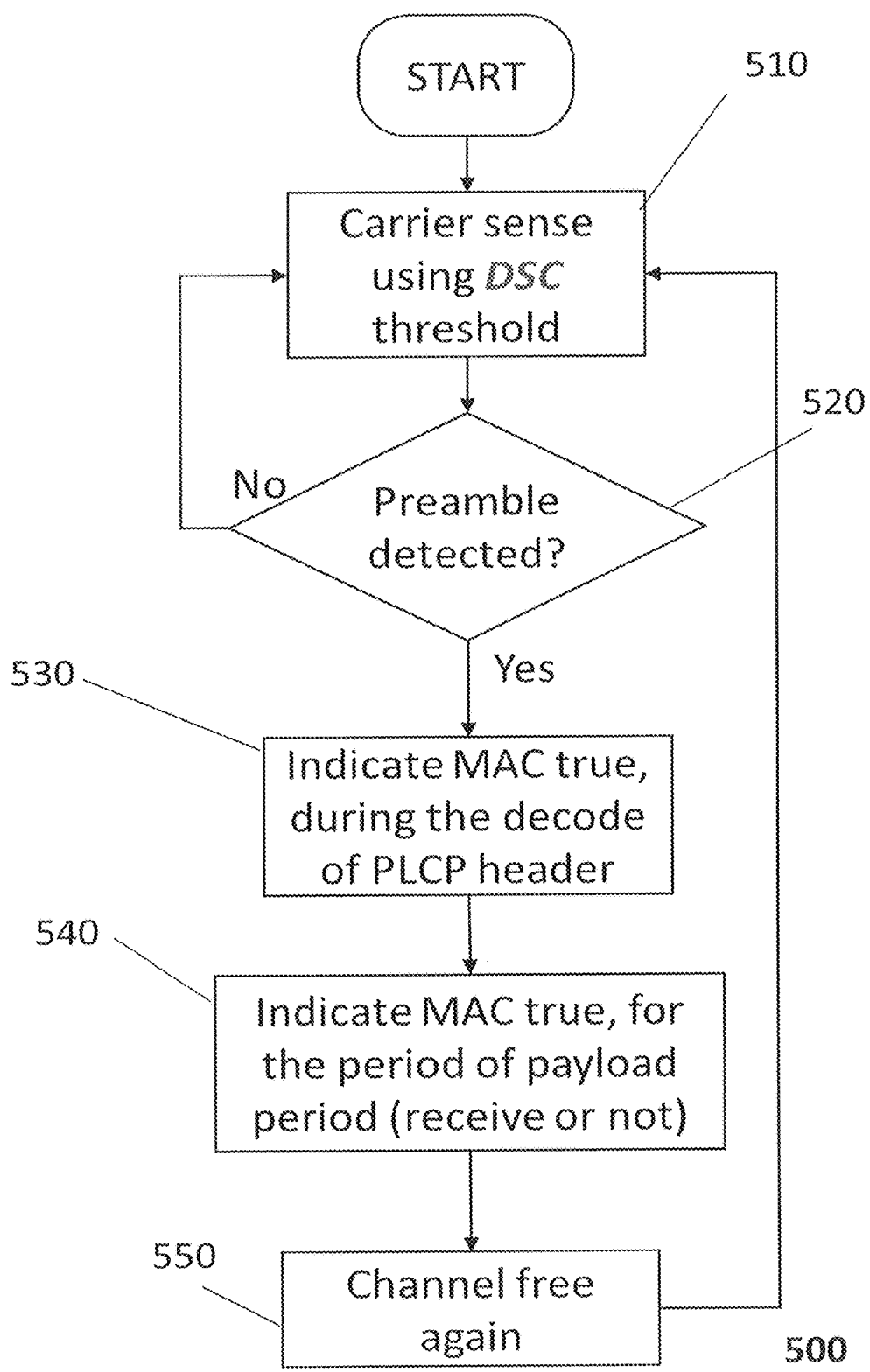
FIG. 7 shows a carrier sense method.

FIG. 7 shows a carrier sense method 500. This may be implemented by an access point or a station. For simplicity, the following description shall assume that the method is operated by an access point. The access point implements dynamic sensitivity control (DSC) to adjust one or more of the CCA thresholds (the carrier sense threshold and/or the energy detection threshold).

Carrier sense is enacted 510 using the adjusted (DSC) carrier sense threshold. The access point monitors the channel 520 to try to detect preambles that exceed the adjusted carrier sense threshold. If no preamble exceeding the adjusted carrier sense threshold is detected, then the method loops back to step 510 to continue carrier sensing.

If a preamble is detected the access point decodes 530 the PLCP header that is received after the preamble. The MAC status is set to TRUE for the period that the header is being decoded. This sets the carrier to busy during the decoding.

If BSS colouring is being implemented, then the frame (the PLCP Service Data Unit) will only be received if the BSS colour in the PLCP header is the same as the BSS colour of the access point.

The MAC header is then decoded and it is determined whether the frame is intended for the access point. If so, then the whole frame is received and decoded so that the payload of the frame is received. If the frame is not intended for the access point then the frame body is ignored. Either way, the MAC status is set to TRUE 540 to set the carrier status to BUSY to prevent the access point transmitting and interfering with the signal.

After the payload period has passed, the channel is freed up for further transmissions 550 and the method loops back to 510 to continue carrier sensing.

Energy detection is also implemented using the adjusted energy detection threshold; however, this is not shown for simplicity. ED is set to TRUE if any signal is detected with a received signal strength exceeding the adjusted ED threshold, otherwise ED is set to false. As with the carrier sense threshold, the energy detection threshold may be varied according to a dynamic sensitivity scheme.

Under the method of FIG. 7, any received signal that has a signal strength below the adapted carrier sense threshold is not processed (is ignored) and so dead zones can emerge in which legitimate users of the network are unable to communicate with the access point.

It can therefore be seen that utilising DSC can result in the carrier sense threshold and/or the energy detection threshold being too high. According to an embodiment, the default carrier sense threshold is utilised and, if the received signal strength of a frame is below a higher DSC carrier sense threshold, the channel is determined to be busy if the frame is determined to be intended for the receiver based on a header of the frame.

Figure 8:
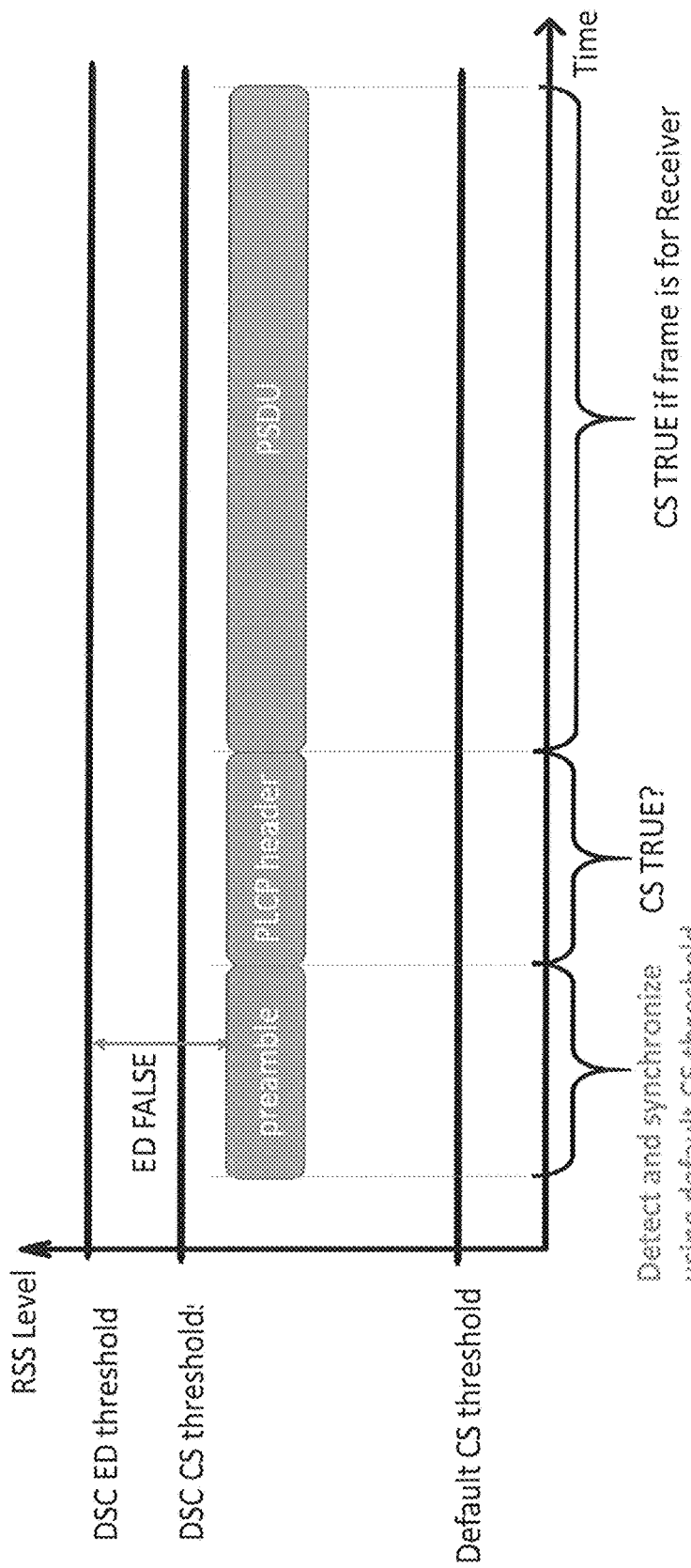
FIG. 8 shows the successful receipt of a frame according to an embodiment.

FIG. 8 shows the successful receipt of a frame according to an embodiment. As in FIGS. 5 and 6, the received signal strength is plotted against time. The default carrier sense (CS) and energy detection (ED) thresholds are shown. The embodiment implements dynamic sensitivity control (DSC) to adapt the carrier sense and energy detection thresholds to produce adapted DSC CS and ED thresholds, also shown in FIG. 8; however the default CS threshold is also utilised. The DSC CS and ED thresholds are higher than the default CS and ED thresholds.

The embodiment applies the adjusted DSC ED threshold but implements both the DSC and default CS thresholds. As with FIG. 6, a frame with a signal strength that is lower than the DSC CS and ED thresholds is received by a receiving device. As the received signal strength of the frame is less than the DSC ED, ED is set to FALSE.

Normally, CS would also be set to FALSE as the received signal strength is less than the DSC CS threshold. In the carrier sense method of this embodiment, however, the default CS threshold is used initially. As the frame has a received signal strength that is between the default and DSC carrier sense thresholds, the embodiment checks to see whether the frame is directed towards the receiving device by decoding the header of the frame. The channel can then be set to busy or idle based on whether or not the frame is intended for the receiving device.

The header of the frame comprises at least the MAC header which contains details of the intended recipient. The header may also comprise the PLCP header when the access point implements BSS colouring. The PLCP header may be checked to determine whether the frame is being transmitted in the same network as the receiving device.

A frame may indicate the receiving device as the intended recipient via the header of the frame having a destination address or receiver address that indicates the receiving device. Alternatively, this may be ascertained via the header indicating that the frame is an association request directed towards the receiving device.

An association request is sent to an access point (the receiving device) whenever a station wishes to join a network. As the station may not know the MAC address of the access point before joining the network, it is not sufficient to merely filter frames based on MAC address. The association request will contain an identifier of the network which the station wishes to join (the service set ID—SSID) and an identifier of a specific access point (the basic service set ID—BSSID). Accordingly, if an association request is received, the frame is determined to be intended for the access point if the header indicates that the station wishes to join the network of the access point and/or wishes to specifically connect to the access point (the header contains the BSSID and/or the SSID of the access point respectively).

As discussed above, the receiving device may also implement BSS colour. Accordingly, the receiving device may determine whether the frame is intended for the network of the receiving device (indicates the BSS colour assigned to the receiving device). As the BSS colour is indicated in the PLOP header, whereas the destination or receiver addresses (or the SSID or BSSID) are located in the MAC header of the frame, the receiving device would first determine whether the BSS colour matches that of the receiving device. If it doesn't, then the carrier is deemed to be idle and the frame is ignored. If it does indicate the correct BSS colour then the receiving device would then read the MAC header to determine whether the frame is intended for the receiving device as discussed above. In some cases, a station may not know the BSS colour of the network before it has associated with the network. Accordingly, association requests which don't indicate a BSS colour are processed to read the MAC address to determine if they are directed towards the receiving device.

In the present case, the header indicates that the frame is intended for the receiving device. Accordingly, the receiving device sets CS to be TRUE for the period during which the content of the frame (the frame body) is received. This will ensure that the carrier is deemed to be busy for the period during which the content is received. Accordingly, transmissions by the receiving device will be delayed to avoid interfering with the receipt of the content.

If the frame is not intended for the receiving device then CS will be set to FALSE. As ED is also FALSE, the carrier will be deemed to be idle and so the receiving device will be free to transmit data over the channel. This allows DSC to be implemented to improve network performance whilst still allowing devices located in dead zones to communicate with the receiving device. Devices located in the dead zones which are part of a different network are still filtered out as their messages will not be deemed to be intended for the receiving device.

Figure 9:
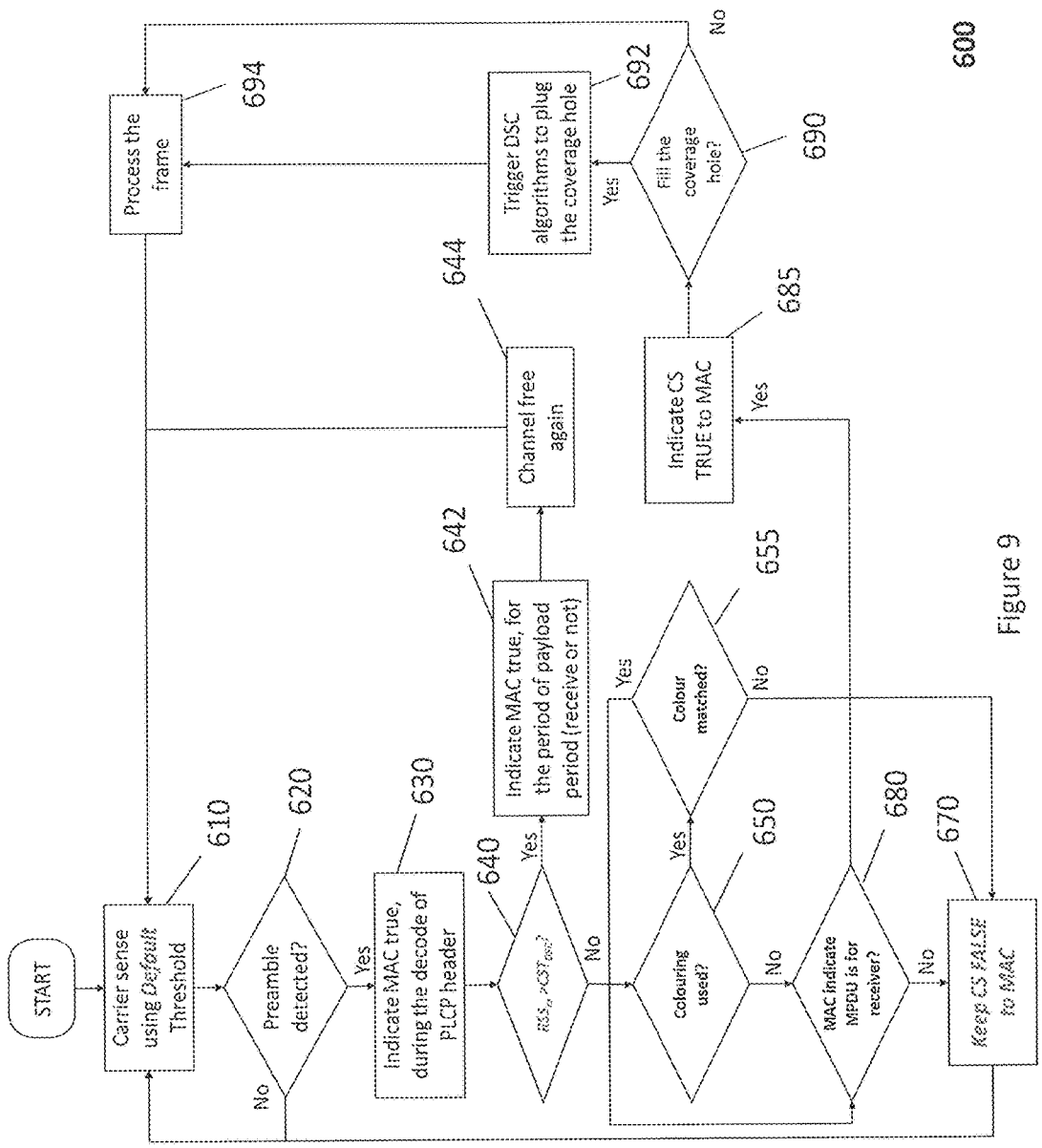
FIG. 9 shows a carrier sense method according to an embodiment.

FIG. 9 shows a carrier sense method 600 according to an embodiment. This method may be implemented by an access point or a station. For simplicity, the following description shall assume that the method is operated by an access point (i.e. that the receiving device is an access point). The method is much like that of FIG. 7; however, it is able to detect stations within the dead zone and process frames received from them should they be directed towards the access point.

The first three steps are the same as the first three steps of the method of FIG. 7. The access point starts by implementing carrier sensing 610 using the default carrier sense threshold ($CST_{Default}$) The default carrier sense threshold is the carrier sense threshold prior to any DSC changes. The default carrier sense threshold may be the lowest signal strength that can be detected by the access point (e.g. −82 dBm), or any other predefined lower level for carrier sensing. When a signal is detected, the access point determines whether a preamble is detected 620. That is, steps 610 and 620 combined determine whether a preamble is detected in a signal that has a received signal strength that is greater than the default carrier sense threshold. If no preamble is detected, the method loops back to step 610 to continue with carrier sensing.

If a preamble is detected, then the PLCP header is decoded and the MAC status is set to true for the period during which the PLOP header is decoded 630. It is then determined 640 whether the received signal strength of the signal ($RSS_{cs}$) is greater than an adapted carrier sense threshold ($CST_{DSC}$). The adapted carrier sense threshold is defined according to dynamic sensitivity control (DSC) rules to improve the sensing threshold according to the performance of the network. Any method of adapting the carrier sense threshold to improve network performance may be implemented.

If the received signal strength of the signal is greater than the adapted carrier sense threshold, then the channel is deemed to be busy 642 (the system indicates "CS TRUE" to the MAC layer) for the period of the payload. This is because a strong signal has been received, and so any transmissions by the access point should be deferred until the carrier (the channel) is free. If the frame is intended for the access point then the payload is decoded. Otherwise, the access point waits until the frame has been transmitted. Once the channel is free again 644 the method loops back to step 610 to begin carrier sensing again.

If the received signal strength is not greater than the adapted CCA threshold (that is, $CST_{Default} < RSS_{CS} < CST_{DSC}$) then the access point determines whether the signal, which would otherwise have been ignored by the access point, is actually intended for the access point. The method varies depending on whether BSS colouring is being used by the station transmitting the frame 650. This involves determining whether the header of the frame specifies a BSS colour. If no colour is specified then BSS colouring is not being used. If BSS colouring is being used then the access point determines whether the BSS colour indicated by the header of the frame (specifically, the PLCP header) matches the BSS colour of the access point 655. If the frame is not colour matched then the carrier is deemed to be idle 670 (CS is set to false) and the method loops back to step 610 to continue carrier sensing.

If the frame is an access request which doesn't specify a BSS colour, then the carrier is deemed to be busy at least until it has been determined whether the access request is directed towards the access point.

If a matching BSS colour is specified, or if BSS colouring is not being used, then the access point decodes the MAC header and determines whether the MAC header indicates that the frame body (the MPDU) is intended for the receiver 680. As mentioned above, this may either be via the header of the frame having a destination address or receiver address that indicates the access point, or may be due to the header indicating that the frame is an association request intended for the access point.

If the header indicates that the frame is not intended for the access point, then the carrier is determined to be idle 670 (CS is set to "FALSE"). This allows the access point to transmit over the carrier, if necessary. The method then returns to step 610 to conduct further carrier sensing.

Whilst setting CS to "FALSE" does not necessarily mean that the carrier will be determined to be idle (as the ED field being "TRUE" would still result in the carrier being determined to be busy), the present example assumes that the received signal is the only signal. In this case, ED will be "FALSE" as the adjusted ED threshold is higher than the adjusted CS threshold which, as has already been established, is higher than the RSS of the frame being received.

If the header indicates that the frame is intended for the access point then the carrier is determined to be busy 685 (CS is set to "TRUE").

At this point, the signal has been identified as being present in a coverage hole. That is, the received signal indicates that a station in the network is located beyond the range of the adjusted carrier sense threshold but within the range of the default carrier sense threshold. This is because the signal strength is between $CST_{Default}$ and $CST_{DSC}$ ($CST_{Default} < RSS_{CS} < CST_{DSC}$) and the signal is intended for the access point.

The access then determines 690 whether to fill the coverage hole by lowering the adjusted carrier sense threshold. This determination is based on rules stored in the access point. For instance, the access point may fill the coverage hole only if it has received a certain number or frequency of signals from the coverage hole that are intended for the access point. Other criteria which may affect whether the coverage hole is plugged include CPU process power load and traffic load.

If a coverage hole is to be filled then the DSC algorithm is triggered to lower the adjusted carrier sense threshold to plug the coverage hole (the adjusted carrier sense threshold is modified to take into account the station that falls outside of its range) 692. The received frame is then processed 694 to decode the content in the frame.

Any method of decreasing the carrier sense threshold may be applied, provided that the determination of the new threshold takes into account the received signal.

If the coverage hole is not to be filled then the received frame is processed 694 without the adjusted carrier sense threshold being modified. After the frame has been processed 694 the method returns to step 610 to continue carrier sensing.

In an alternative embodiment, the access point automatically fills any detected coverage holes. Accordingly, the determination step of 690 is not enacted and the access point lowers the adjusted carrier sense threshold every time a signal intended for the access point is received with a received signal strength that is between the default and adjusted carrier sense threshold.

When the carrier (the channel) is determined to be busy, any transmissions from the receiving device will be delayed until the carrier is determined to be idle. This helps to prevent frame collisions.

A number of alternative embodiments are proposed for the receipt of preambles and headers that have received signal strengths between the default and DSC carrier sensing thresholds.

In a first embodiment, CS is set to TRUE (the channel is determined to be busy) during the receipt and decoding of the preamble and header of the frame. That is, the channel is determined to be busy during the receipt of the frame until it is determined that the frame is not intended for the receiving device, at which point the channel is determined to be idle.

In a second embodiment, CS is set to FALSE (the channel is determined to be idle) during the receipt and decoding of the preamble and header of the frame. That is, the channel is determined to be idle during the receipt of the frame until it is determined that the frame is intended for the receiving device, at which point the channel is determined to be busy.

The first embodiment prevents more collisions but is less efficient as transmissions from the receiving device may be delayed even when the frame is not intended for the receiving device. The second embodiment is more efficient and, whilst there may be more collisions caused by the carrier being deemed idle during the receipt of headers having an RSS between the two CS thresholds, such headers are relatively rare as they must first arise from devices located in a dead zone, and the $CS_{DSC}$ threshold will subsequently be adapted to account for these signals and to plug any coverage holes. Accordingly, the relatively small number of collisions caused by these headers can be accepted in order to provide a more efficient carrier sensing method in which transmissions are not needlessly delayed.

To mitigate any delay caused by the first embodiment, a third embodiment is proposed. In the third embodiment, a delay interval is applied to any transmissions that the receiving device schedules for the period during which the preamble and header are being received and decoded. This delay is different to the normal delay applied during carrier sensing (as shall be discussed below). If the channel becomes busy during this period then the transmission is delayed further. This allows the delay caused by the carrier becoming busy to be reduced to speed up transmission.

Figure 10:
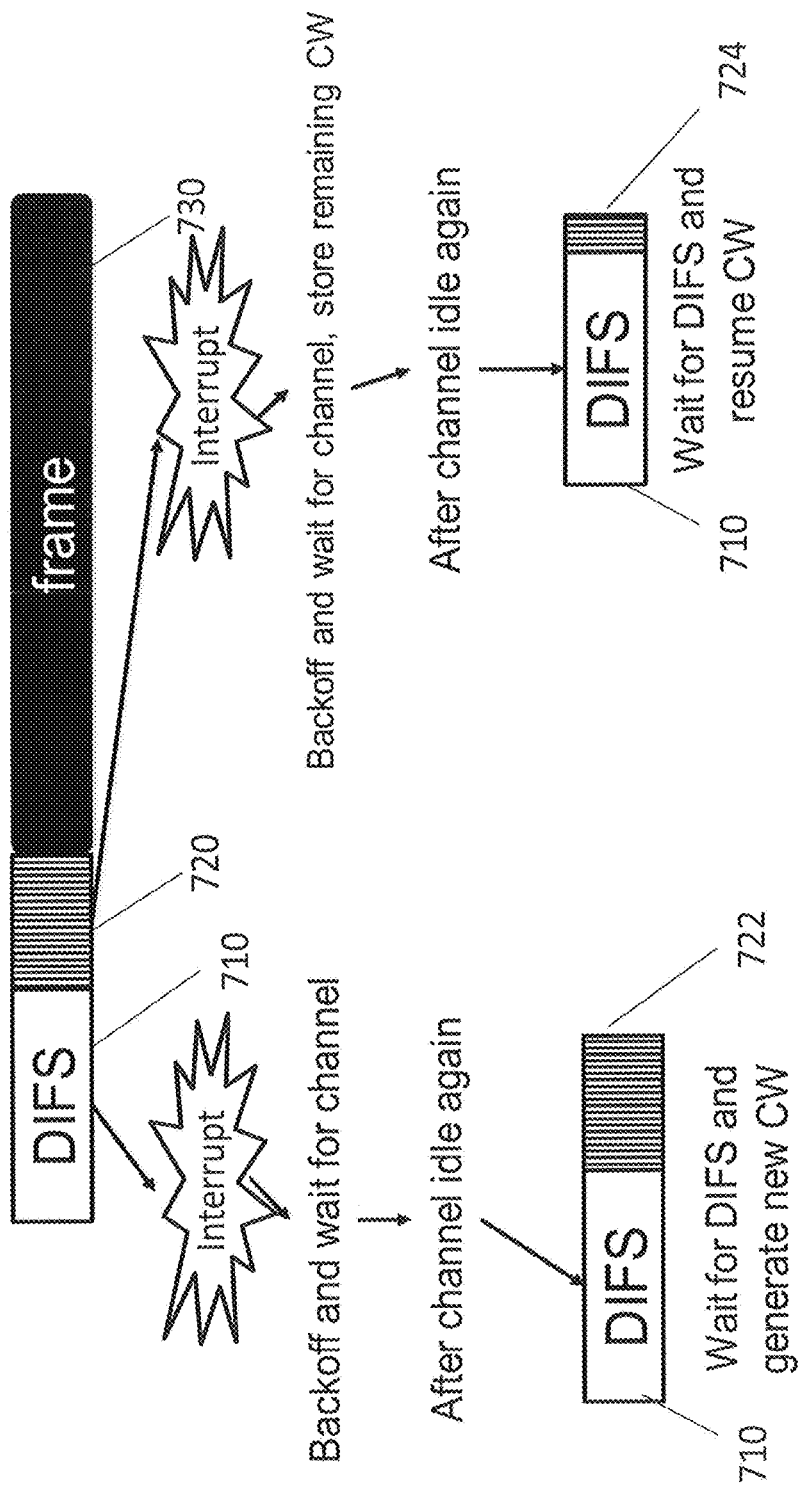
FIG. 10 shows an interruption procedure for a first embodiment.

FIG. 10 shows a first interruption procedure. Before a frame 730 can be transmitted, the device attempting to transmit must first wait for a given period to check whether the carrier is free. The device waits for a predefined period, the DIFS interval 710 (the DCF Inter-frame Space Interval). If the channel is idle for the whole of this period then a random countdown (a contention window) is generated 720 and, once the countdown has finished, the frame is transmitted. The contention window is randomly selected from a range of allowable periods.

If the channel is busy or becomes busy during the DIFS period 710 then the device backs off and the transmission is delayed by the DIFS period 710 and a new contention window 722.

The second embodiment shall now be described with reference to the attempted transmission of a frame by the receiving device:
1) The receiving device (e.g. an access point) schedules a frame to be transmitted. The frame is loaded into a buffer and the receiving device sets up a timer (T1) in its processor to count down for transmission. This timer will have highest interruption priority.
2) A communication having an RSS higher than $CST_{default}$ but lower than $CST_{DSC}$ is received and synchronized by the carrier sense method (as shown in FIG. 8).
3) T1 keeps counting down as the header is being decoded (as the channel is set to be idle for this period).
4) If T1 reaches zero before the header decoding completes, the timer interrupts the current receive routine and begins transmission immediately.
5) If the header decoding is completed before T1 reaches zero, the receiving device will set CS to be TRUE because the receiving device will recognize from the header that the frame is for itself. The channel is then determined to be busy and CCA busy is indicated to the MAC. Timer T1 is stopped and PHY.RXSTART event is triggered to delay the transmission until after the frame has been received. If the received frame is not for the receiving device then the channel will be idle when T1 reaches zero and so transmission will happen.

In the first embodiment, the above process is the same; however, the timer is stopped in step 3 as the channel is deemed to be busy during the decoding of the preamble and header. This avoids any data being transmitted during the receipt and decoding of the header and therefore prevents collisions but slows down transmission. Step 4 is not applicable in this scenario as the timer cannot reach zero before decoding is completed. In the third embodiment, the above process is the same; however, a delay interval is added to the timer T1 in step 3 and the DIFS interval is not applied after the channel becomes idles (see below).

The delay interval can be the remaining time left in the DIFS period, or any other period, such as the Short Inter-frame Space Interval (SIFS) or the PCF Inter-frame Space Interval (PIFS).

Figure 11:
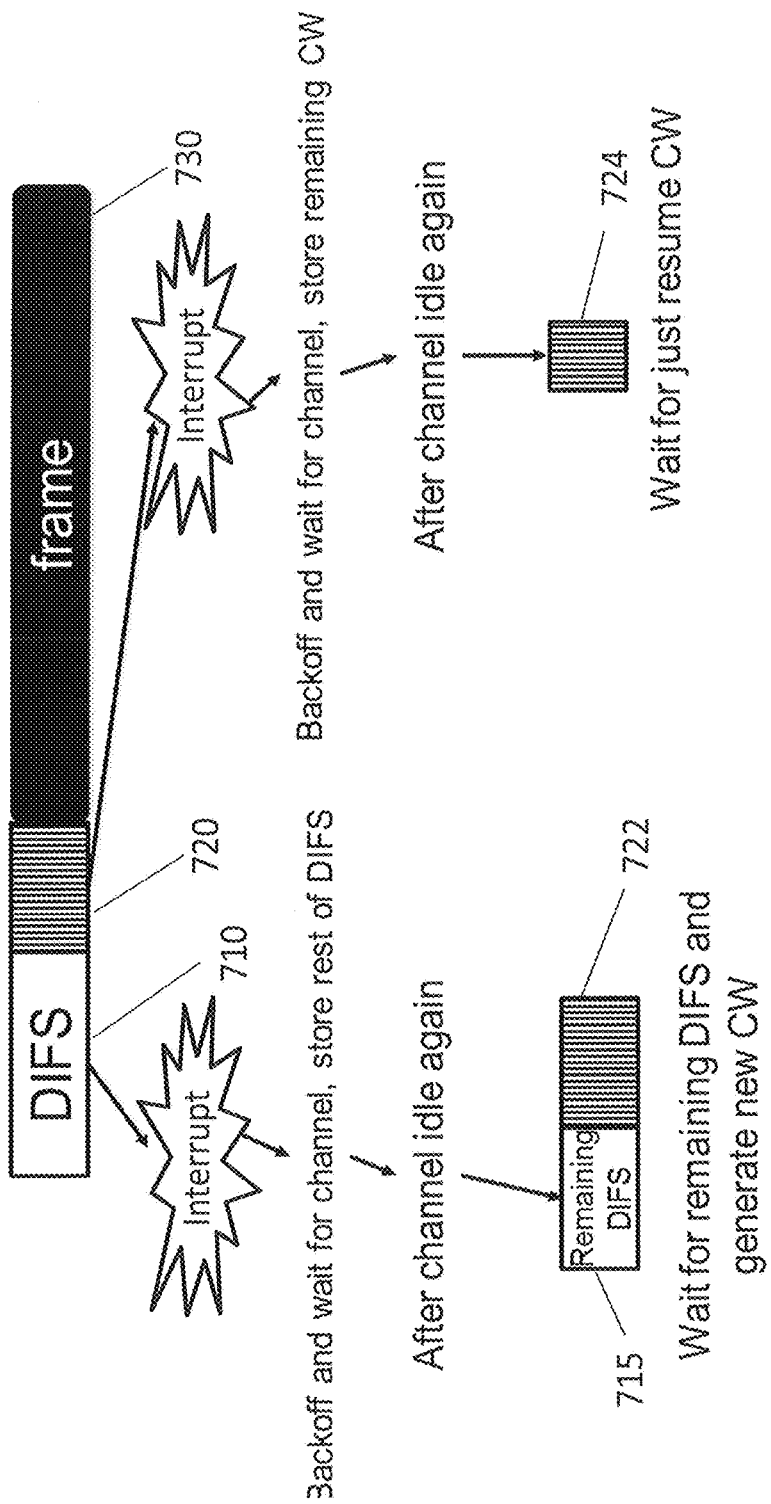
FIG. 11 shows an interruption procedure for a second embodiment.

FIG. 11 shows a second interruption procedure. In this embodiment, if the channel becomes busy during the original DIFS interval 710 then the transmission is paused, as in the first interruption procedure. Having said this, once the channel becomes idle again a different delay interval is applied to the transmission. In this case, the remaining time 715 that was left in the original DIFS interval 710 is applied. After this time has expired, the device waits for a new contention window 722.

If the carrier becomes busy during the contention window 720 then the transmission attempt is paused, as in the first interruption procedure. Again, the timer on the contention window 720 is saved so that the countdown may be resumed after the channel has become idle. This method differs from the first interruption procedure, however, in that no DIFS interval is applied. Instead, the contention window is resumed immediately after the carrier becomes idle. This speeds up transmission.

Figure 12:
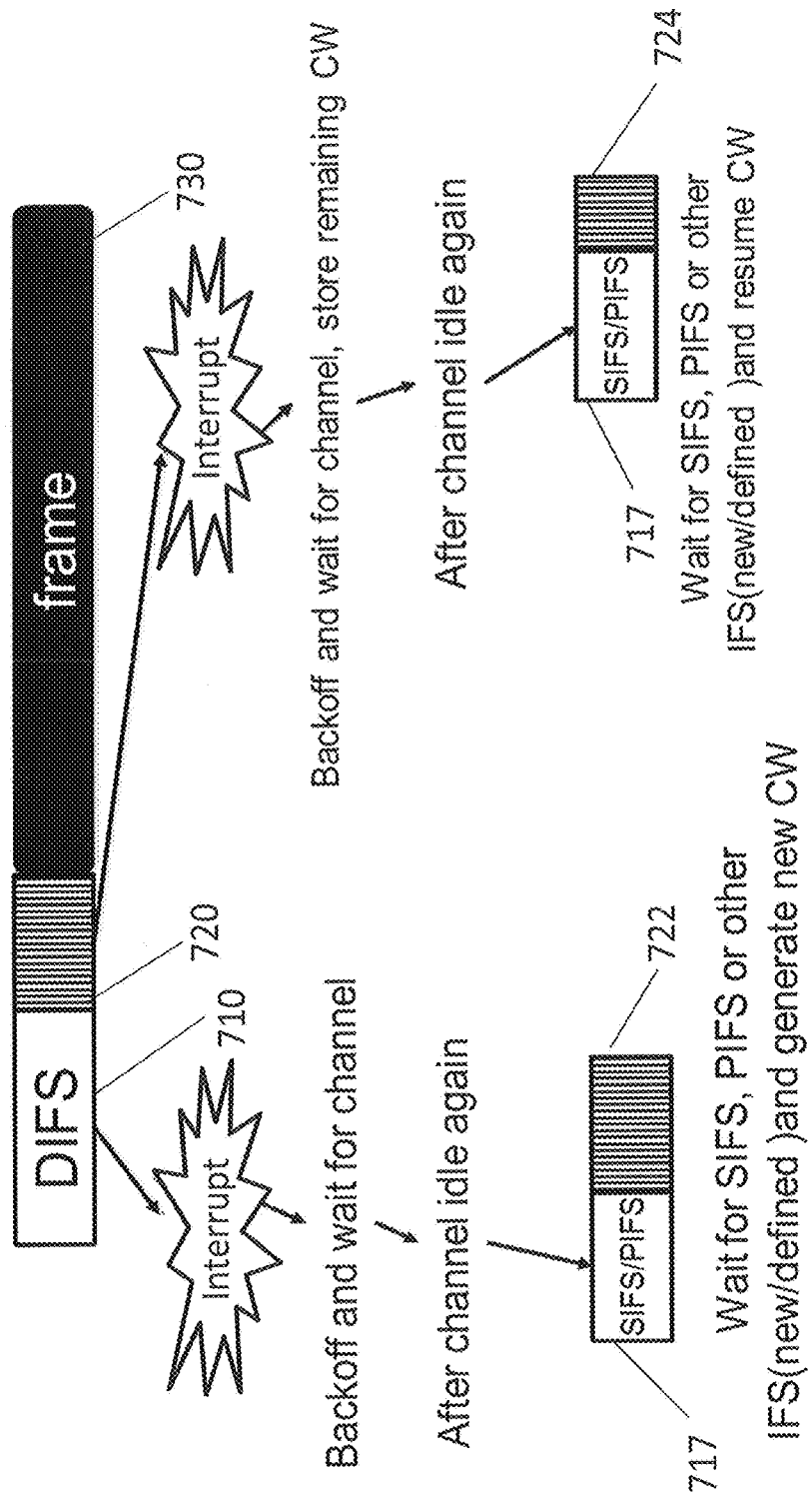
FIG. 12 shows an interruption procedure for a third embodiment.

FIG. 12 shows a third interruption procedure. As before, if the channel becomes idle during the DIFS interval 710 then the transmission is paused. This time, when the channel becomes idle again, a predefined delay is applied that is different to the DIFS interval. FIG. 12 shows the SIFS or PIFS intervals 717 being applied. Once this predefined period has expired, then a new contention window 722 is applied.

If the carrier becomes busy during the contention window 720 then the transmission attempt is paused, as in the first and second interruption procedures. Again, the timer on the contention window 720 is saved so that the countdown may be resumed after the channel has become idle. This method differs from the first and second interruption procedures, however, in that after the channel becomes idle a predefined delay, different to the DIFS interval, is applied. The PIFS interval or the SIFS interval 717 may be applied. Once the delay has passed, the contention window 724 is resumed. Applying a delay other than the DIFS interval can help to speed up transmission (where the delay is shorter than the DIFS interval) or more efficiently manage transmission attempts.

Accordingly, embodiments provide more effective methods of carrier sensing, in which dynamic sensitivity may be applied by access points without preventing new edge users from joining the network and without preventing current users from moving further from the access point, out of range of the adapted DSC carrier sensing threshold, but within the maximum possible detection range of the access point. In addition, any coverage holes may be plugged by the system detecting when a station is located outside of the range of the adapted DSC carrier sensing threshold and adjusting the threshold accordingly.

The embodiments described herein may utilise any form of dynamic sensitivity control, or any other means of adapting the threshold(s) used in clear channel assessment to improve network performance. The default carrier sensing threshold used may be any predefined threshold. For instance, it may be defined by the manufacturer and may be the minimum effective carrier sensing threshold.

Embodiments may be implemented on any existing access point or station by reconfiguring hardware and/or updating software installed on the devices. For instance, an embodiment may be implemented by installing a plug-in or update to existing configuring software stored on a device. Alternatively, an embodiment may be implemented by complete replacement of the software on the device. Alternatively, an embodiment may be implemented via completely original equipment.

While certain embodiments have been described, the embodiments have been presented by way of example only, and are not intended to limit the scope of the inventions. Indeed, the novel methods and devices described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A device for wirelessly communicating over a transmission channel with one or more wireless devices within a network, the device comprising:
 a wireless network interface; and
 a controller configured to:
  receive a wireless signal transmitted over the transmission channel, via the wireless network interface;
  hold a first threshold and a second threshold, the first threshold defining sensitivity of the device to the strength of the received wireless signal, and the second threshold defining a default threshold for the first threshold;
  vary the first threshold to optimize the performance of the network;
  in response to a determination that the strength of a wireless signal received over a specific transmission channel is greater than the varied first threshold, determine that the specific transmission channel is busy; and
  in response to a determination that the strength of a wireless signal received over the specific transmission channel is not greater than the varied first threshold, but is greater than the second threshold, determine whether the received wireless signal is intended for the device and if so, determine that the specific transmission channel is busy.

2. A device according to claim 1 wherein:
 the second threshold is a predefined threshold; and
 the controller is configured to vary the first threshold based on a predefined set of dynamic sensitivity control rules.

3. A device according to claim 2 wherein the controller is configured to, if the received wireless signal is determined to be intended for the device, lower the first threshold to improve detection of any further wireless signals to be received over the transmission channel.

4. A device according to claim 1 wherein the controller is further configured to:
 decode a header portion of the received wireless signal, and
 determine that the received wireless signal is intended for the device when the header includes an indication that the device is an intended recipient.

5. A device according to claim 4 wherein the indication that the device is an intended recipient comprises one or more of a media access protocol address of the device, a service set ID of the device, a basic service set ID of the device or a basic service set colour of the device.

6. A device according to claim 4 wherein the controller is configured to, during the decoding of the header portion:
 determine that the transmission channel is idle; or
 determine that the transmission channel is busy.

7. A device according to claim 1 wherein the controller is configured to:
 prior to transmitting a wireless signal over the transmission channel, determine if the transmission channel is idle over a first predefined period of time and a first randomly assigned period of time;
 if the transmission channel is busy during the first predefined period of time, delay transmission until the transmission channel becomes idle;
 once the transmission channel becomes idle, determine if the transmission channel is idle over a further period and, if the transmission channel is idle for the whole of the further period, begin transmission of the wireless signal,
 wherein the further period includes:
  either one of the first predefined period of time, the remaining period of time left in the first predefined period of time, and a second predefined period of time that is different from the first predefined period of time; and
  a second randomly assigned period of time.

8. A device according to claim 1 wherein the controller is configured to:
 prior to transmitting a wireless signal over the transmission channel, determine if the transmission channel is idle over a first predefined period of time and a first randomly assigned period of time;
 if the transmission channel is busy during the first randomly assigned period of time, delay transmission until the transmission channel becomes idle and store the remaining period of time left in the first randomly assigned period of time; and
 once the transmission channel becomes idle, determine if the transmission channel is idle over a further period and, if the transmission channel is idle for the whole of the further period, begin transmission of the wireless signal,
 wherein the further period includes:
  a sum of one of the first predefined period of time and a second predefined period of time that is different from the first predefined period of time, and the remaining period of time left in the first randomly assigned period of time; or
  the remaining time left of the first randomly assigned period of time.

9. A method for managing a device for wirelessly communicating over a transmission channel with one or more wireless devices within a network, the device comprising a wireless network interface and a controller configured, the method comprising causing the controller to:

receive a wireless signal transmitted over the transmission channel, via the wireless network interface;

hold a first threshold and a second threshold, the first threshold defining sensitivity of the device to the strength of the received wireless signal, and the second threshold defining a default threshold for the first threshold;

vary the first threshold to optimize the performance of the network;

in response to a determination that the strength of a wireless signal received over a specific transmission channel is greater than the varied first threshold, determine that the specific transmission channel is busy; and in a response to a determination that the strength of a wireless signal received over the specific transmission channel is not greater than the varied first threshold, but is greater than the second threshold, determining whether the received wireless signal is intended for the device and if so, determine that the specific transmission channel is busy.

10. A method according to claim 9 wherein the second threshold is a predefined threshold, and further comprising causing the controller to vary the first threshold based on a predefined set of dynamic sensitivity control rules.

11. A method according to claim 10 further comprising causing the controller to, if the received wireless signal is determined to be intended for the device, lower the first threshold to improve detection of any further wireless signals to be received over the transmission channel.

12. A method according to claim 9 further comprising causing the controller to decode a header portion of the received wireless signal, to determine that the received wireless signal is intended for the device when the header includes an indication that the device is an intended recipient.

13. A method according to claim 12 wherein the indication that the device is an intended recipient comprises one or more of a media access protocol address of the device, a service set ID of the device, a basic service set ID of the device or a basic service set colour of the device.

14. A method according to claim 12 further comprising causing the controller, during the decoding of the header portion, to:

determine that the transmission channel is idle; or
determine that the transmission channel is busy.

15. A method according to claim 9 wherein the method further comprises causing the controller to:

prior to transmitting a wireless signal over the transmission channel, determine if the transmission channel is idle over a first predefined period of time and a first randomly assigned period of time;

if the transmission channel is busy during the first predefined period of time, delay transmission until the transmission channel becomes idle;

once the transmission channel becomes idle, determine if the transmission channel is idle over a further period and, if the transmission channel is idle for the whole of the further period, begin transmission of the wireless signal, wherein the further period includes:

either one of the first predefined period of time, the remaining period of time left in the first predefined period of time, and a second predefined period of time that is different from the first predefined period of time; and a second randomly assigned period of time.

16. A method according to claim 9 wherein method further comprises causing the controller to:

prior to transmitting a wireless signal over the transmission channel, determine if the transmission channel is idle over a first predefined period of time and a first randomly assigned period of time;

if the transmission channel is busy during the first randomly assigned period of time, delay transmission until the transmission channel becomes idle and storing the remaining period of time left in the first randomly assigned period of time; and once the transmission channel becomes idle, determine if the transmission channel is idle over a further period and, if the transmission channel is idle for the whole of the further period, begin transmission of the wireless signal, wherein the further period includes:

a sum of one of the first predefined period of time and a second predefined period of time that is different from the first predefined period of time, and the remaining period of time left in the first randomly assigned period of time; or the remaining time left of the first randomly assigned period of time.

* * * * *